United States Patent [19]
May et al.

[11] Patent Number: 5,971,229
[45] Date of Patent: Oct. 26, 1999

[54] AUTOMATIC LUBRICANT DISPENSER

[75] Inventors: Anton May, Burkardroth; Claus Helbig, Schonungen; Bernd Scheit, Aschach; Stefan Brand, Bad Kissingen, all of Germany

[73] Assignee: Perma-Tec GmbH & Co. KG, Euerdorf, Germany

[21] Appl. No.: 08/966,502

[22] Filed: Nov. 10, 1997

[30]     Foreign Application Priority Data

Sep. 3, 1997 [DE] Germany ............... 297 15 808 U

[51] Int. Cl.⁶ ........................................... F16N 7/14
[52] U.S. Cl. ................................. 222/390; 222/327
[58] Field of Search .................. 222/325, 326, 222/327, 333, 390

[56]           References Cited

U.S. PATENT DOCUMENTS

| 3,993,226 | 11/1976 | Pavenick | 222/390 X |
|---|---|---|---|
| 4,087,025 | 5/1978 | Steiman | 222/321 |
| 4,258,866 | 3/1981 | Bergman | 222/390 X |
| 4,671,386 | 6/1987 | Orlitzky | 222/389 X |
| 5,271,528 | 12/1993 | Chien | 222/390 X |
| 5,732,794 | 3/1998 | Orlitzky | 222/326 X |

FOREIGN PATENT DOCUMENTS 92 14 096   2/1993   Germany .

*Primary Examiner*—Andres Kashnikow
*Assistant Examiner*—Sean P. O'Hanlon
*Attorney, Agent, or Firm*—Herbert Dubno; Andrew Wilford

[57]           ABSTRACT

An automatic lubricant dispenser has a lower housing part formed with an outlet, a piston displaceable along an axis in the lower part and forming therein a compartment, a spindle extending along the axis, threaded into the piston, having an upper end above the piston provided with a lower coupling half, and a body of fluent lubricant filling the compartment and forming with the spindle, piston, and lower housing part a lower subassembly. An upper housing part securable to the lower part via a screwthread forms an upper subassembly. An insert mainly in the upper housing part forms a battery compartment and carries a motor unit having an output shaft projecting downward therefrom at the axis and provided with an upper coupling half axially engageable with the lower coupling half. The coupling halves are axially engageable to rotationally couple the motor output shaft to the spindle. A battery is provided in the battery compartment and a circuit board fixed to the insert is connected between the battery and the motor unit. An on-off switch mounted on the circuit board is actuatable to energize the motor unit from the battery. The insert, motor unit, battery, circuit board, and switch together forming a core subassembly normally held between the upper and lower subassemblies.

10 Claims, 2 Drawing Sheets

AUTOMATIC LUBRICANT DISPENSER

FIELD OF THE INVENTION

The present invention relates to an automatic lubricant dispenser. More particularly this invention concerns such a dispenser that is connected to a piece of machinery so as periodically to supply it with fresh lubricant.

BACKGROUND OF THE INVENTION

As described in commonly owned U.S. Pat. No. 5,634,531 an automatic lubricant dispenser has a vessel adapted to hold a supply of a fluent lubricant and having one side formed with an outlet adapted to be connected to a machine to be lubricated and an opposite side, a piston in the vessel movable forward toward the one side to force the lubricant from the outlet, and an electric drive connected to the piston and electrically energizable to advance the piston forward. An electric power source is connected via an electrical circuit to the drive for periodically energizing the drive and thereby advancing the piston an increment and pumping a dose of the lubricant from the outlet.

German utility model 9,214,096 describes such a system where the motor has a rotary output shaft connected via gearing to a spindle threaded into the piston which is prevented from rotating. The motor is powered from batteries mounted in the dispenser housing. The housing is formed by a lower part that forms together with the piston a compartment filled with a fluent lubricant and an upper part containing the motor and batteries. The threaded spindle fixed to the transmission of the electric-motor drive unit is threaded into the piston which is impeded from rotating so that, when the spindle rotates, the piston is advanced.

When the supply of lubricant is exhausted, the motor is reversed to its starting position with the piston all the way up. Then the upper housing part and motor unit are separated from the lower housing part which is in turn disconnected from the feed line to the machine being lubricated. A new lower part filled with lubricant is installed, the upper housing part is fitted in place, and the system can be restarted.

The disadvantage of this system is that if the piston is not perfectly positioned when a new lower lubricant-filled housing part is installed there can be problems. If the piston is too low it will now allow the assembly to be put back together without extruding out some of the lubricant and making a mess. If it is too high, for the first couple of cycles the piston will move without actually contacting or pressurizing the lubricant mass so that no lubricant dosing will take place. In general it is difficult to provide such a system with a new lubricant supply.

OBJECTS OF THE INVENTION

It is therefore an object of the present invention to provide an improved automatic lubricant dispenser.

Another object is the provision of such an improved automatic lubricant dispenser which overcomes the above-given disadvantages, that is which is easy to refill.

SUMMARY OF THE INVENTION

An automatic lubricant dispenser according to the invention has a lower housing part formed with an outlet, a piston displaceable along an axis in the lower part and forming therein a compartment, a spindle extending along the axis, threaded into the piston, having an upper end above the piston provided with a lower coupling half, and a body of fluent lubricant filling the compartment and forming with the spindle, piston, and lower housing part a lower subassembly. An upper housing part securable to the lower part via a screwthread forms an upper subassembly. An insert mainly in the upper housing part forms a battery compartment and carries a motor unit having an output shaft projecting downward therefrom at the axis and provided with an upper coupling half axially engageable with the lower coupling half. The coupling halves are axially engageable to rotationally couple the motor output shaft to the spindle. A battery is provided in the battery compartment and a circuit board fixed to the insert is connected between the battery and the motor unit. An on-off switch mounted on the circuit board is actuatable to energize the motor unit from the battery. The insert, motor unit, battery, circuit board, and switch together forming a core subassembly normally held between the upper and lower subassemblies.

Thus with this system when the dispenser is empty the upper part of the housing forming the upper subassembly can be removed and then the core subassembly lifted out with the motor, control circuit, and batteries. This leaves the lower subassembly formed by the plastic lower housing part, plastic piston, and normally metallic spindle which are disconnected, discarded, and replaced with a full core assembly comprising a new lower housing part, lubricant body, piston, and spindle. When the insert is reinstalled the connection is made between the motor output shaft and spindle and putting back the upper housing part permanently puts the assembly back together. Since the lower subassembly forms a disposable refill, the piston will be perfectly positioned so that when the device is restarted lubricant will be emitted with the first cycle. In addition it is possible to standardize the dimensions of the core and upper subassemblies, providing longer or shorter lower subassemblies depending on how much lubricant is needed.

The motor unit according to the invention includes an electric motor positioned mainly to one side of the axis. The insert has a radially outwardly projecting annular ridge engaged between a lower end face of the upper housing part and an upper end face of the lower housing part. In addition the insert is upwardly open and has a lower end wall to which the motor unit is fixed and through which the shaft projects. The battery compartment is angularly elongated and holds several such batteries. Normally in accordance with the invention the circuit board is fixed to the insert above the motor unit. The upper housing part is formed with a pressure element engageable with the switch to actuate same. This pressure element is threaded into the upper housing part to move axially relative to the switch when turned. Thus to start up the system the element is rotated, thereby closing the on-off switch.

The upper coupling half includes a socket element carried on the output shaft and a slide bearing between the socket and the insert. Since in use the lubricant is pressurized and the piston and spindle are urged upward with a constant force, this bearing transmits this force to the insert and therethrough to the housing without overloading the motor unit, which typically includes a direct-current motor and transmission. The lower coupling half is a faceted nut that is provided on the spindle and that fits complementarily in the socket element. The piston has a collar surrounding the spindle and bearing axially upward on the nut. An elastomeric O-ring is provided between the spindle and the collar and a seal engaged between the piston and the lower housing part inhibits rotation of the piston in the lower housing part about the axis.

The circuit board includes circuitry incorporating a clock and a contactless sensor for periodically energizing the motor and thereby advancing the piston and forcing the lubricant from the outlet. After a predetermined number of advances the circuitry knows from the sensor that the piston is in an end position and stops advancing it while normally setting off an alarm or lighting a lamp to indicate that the dispenser is empty and should be fitted with a new lubricant supply. The sensor can be an infrared reflex-type sensor that reads markings on the drive-shaft socket as it rotates. A stop signal can be emitted after a partial or full rotation or after several full rotations of the spindle. The circuitry also includes a sensor for monitoring the motor's current consumption and cutting off the motor from the battery when the motor unit draws current exceeding a predetermined limit. When the piston is at the end of its travel and the motor tries to turn it, therefore, the excess current consumption of the jammed motor will indicate to the circuit that the device is empty and should be serviced. Normally the sensor is set to respond with the equivalent of a pressure exceeding 5 bar. This prevents the battery from being unnecessarily discharged once the dispenser is empty.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
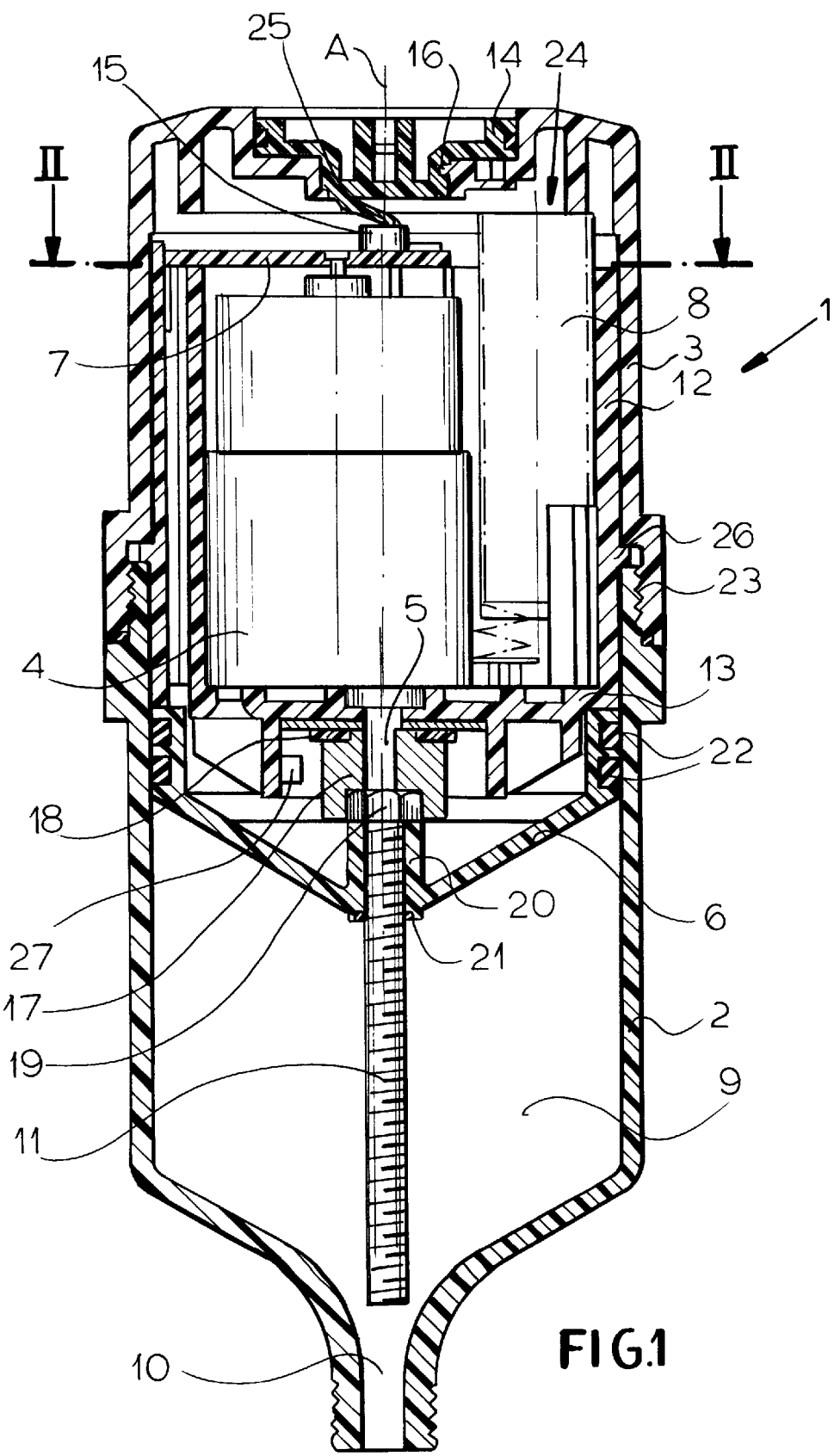
FIG. 1 is an axial section through the dispenser according to the invention.
Figure 2:
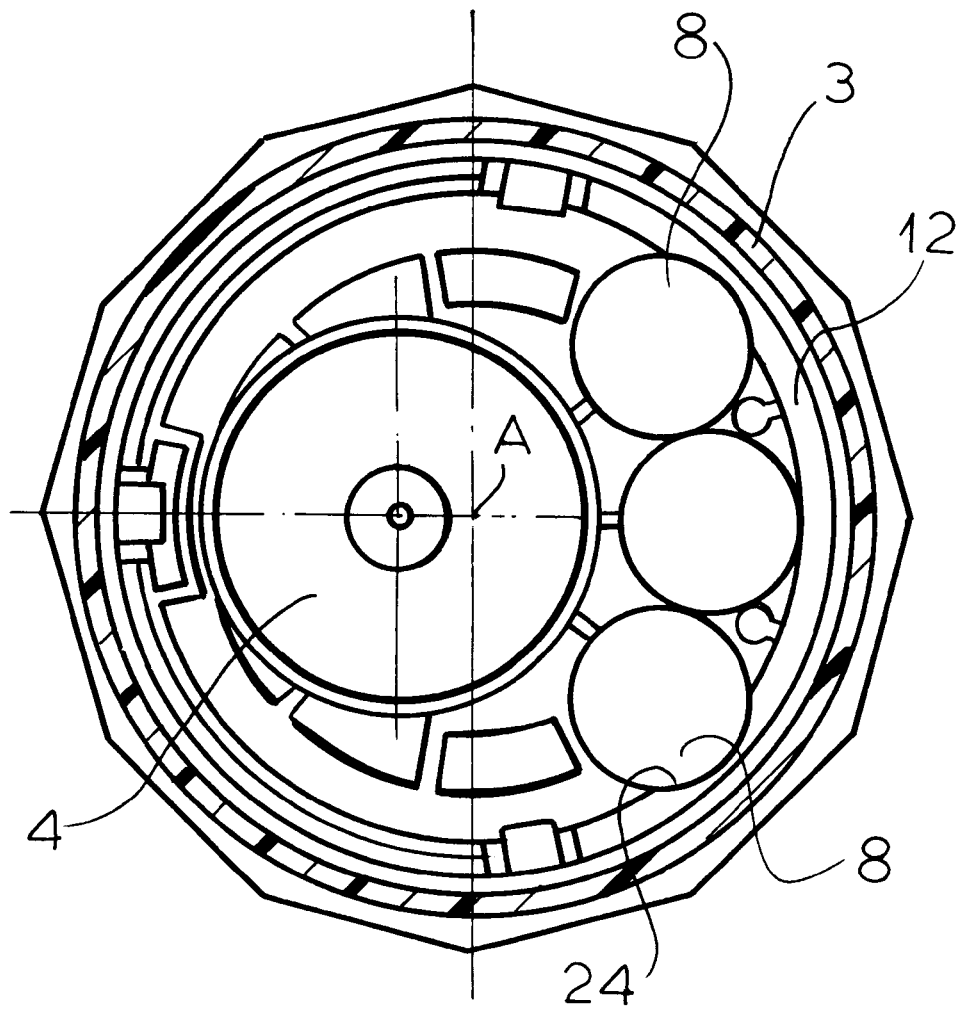
FIG. 2 is a section taken along line II—II of FIG. 1.

As seen in FIG. 1 an automatic lubricant dispenser according to the invention has a housing 1 formed by an upwardly concave cup-shaped lower part 2 and a downwardly concave cup-shaped upper part 3 interconnected at a central screwthread 23 and centered on a normally upright axis A. An electric motor-transmission unit or drive 4 in the housing 1 has an output shaft 5 centered on the axis A. An upwardly cup-shaped insert 12 has a lower end wall 13 to which the motor unit 4 is screwed and carries at its upper end a printed-circuit plate 7 in turn carrying the control circuitry for the system as well as an on-off switch 15. This insert 12 has a radially outwardly projecting ridge 26 that is engaged between a downwardly directed shoulder surface of the upper part 3 and an upwardly directed end surface of the lower part 2. The motor unit 4 is mainly to one side of the axis A and to the other side the insert 12 forms a compartment 24 for batteries 8. Thus in accordance with the invention the insert 12 together with the motor-drive unit 4, circuit 7, and batteries 8 forms a neat subassembly that can be removed and replaced easily.

A frustoconical piston 6 is axially slidable in the basically cylindrical lower housing part 2 and forms therewith a compartment 9 filled with fluent lubricant, normally bearing grease or the like, that can be extruded downward through a central outlet 10. To this end a spindle 11 is threaded in a central collar 20 of the piston 6 which is sealed via O-rings 22 in the part 2 so that it cannot rotate about the axis A therein. At its upper end the spindle 11 has a hexagonal head 19 that forms a lower coupling half that fits in a complementary socket 17 fixed on the shaft 5 and forming an upper coupling half to rotationally couple the spindle 11 to the shaft 5. Seals 21 around the spindle 11 prevent leakage back up along it and a Teflon slide washer 18 is provided between the socket 17 and the plate 13 to reduce friction.

A rotatable knob or plate 14 is mounted via a simple one-turn screwthread 16 in the upper housing part 3 and has a finger 25 that can engage and actuate the switch 15. In the illustrated down position the finger 25 of the knob 14 actuates the switch 15 and turns on the system via its circuit 7. The system is set to periodically actuate the motor 4 and deliver a dose of the lubricant from the compartment 9 to the machine being serviced. The circuit 7 also has an overload sensor that detects when the motor 4 is running against an excessive load, normally indicating that the piston 6 is all the way down bearing against the lower end of the housing part 2, and sounds an alarm or lights a lamp to indicate that it should be serviced. It also has a sensor 27 that monitors rotation of the socket 17.

The entire unit is normally delivered to the user with the compartment 9 full. It is connected at 10 to the machine being serviced and the knob 14 is turned to start it up by closing the switch 15.

When the lubricant runs out, the upper part 3 is screwed off and the subassembly of the insert 13, motor 4, circuit plate 7, and batteries 8 is removed. Then the subassembly comprised of the lower housing part 2, piston, spindle 11, and what is left of the body of lubricant filling the compartment 9 is disconnected at 10 from the machine it is servicing and another such subassembly is mounted in its place. Then the insert 12 and its associated parts are reinstalled and the upper part 3 is screwed back into place, restarting the system. The connection of the shaft 5 to the new spindle 11 is automatic when the socket 17 is fitted over the nut end 19.

We claim:

1. An automatic lubricant dispenser comprising:

a lower housing part formed with an outlet;

a piston displaceable along an axis in the lower part, forming therein a compartment, and having a collar;

a spindle extending along the axis in the collar, threaded into the piston, and having an upper end above the piston provided at the axis with a nut bearing axially on the collar;

a body of fluent lubricant filling the compartment and forming with the spindle, piston, and lower housing part a lower subassembly;

an upper housing part securable to the lower part via a screwthread and forming an upper subassembly;

an insert mainly in the upper housing part and forming a battery compartment;

a motor unit fixed to the insert and having an output shaft projecting downward therefrom at the axis and provided at the axis with a socket complementary to and axially engageable with the nut, the nut and socket releasably axially interfitting in each other to rotationally couple the motor output shaft to the spindle when the upper housing part holding the insert is mounted on the lower housing part;

a slide bearing between the socket and the insert;

a battery in the battery compartment;

a circuit board fixed to the insert and connected between the battery and the motor unit; and an on-off switch mounted on the circuit board and actuatable to energize the motor unit from the battery, the insert, motor unit, battery, circuit board, and switch together forming a core subassembly normally held between the upper and lower subassemblies.

2. The automatic lubricant dispenser defined in claim 1 wherein the motor unit includes an electric motor positioned mainly to one side of the axis.

3. The automatic lubricant dispenser defined in claim 1 wherein the insert has a radially outwardly projecting annular ridge engaged between a lower end face of the upper housing part and an upper end face of the lower housing part.

4. The automatic lubricant dispenser defined in claim 3 wherein the insert is upwardly open and has a lower end wall to which the motor unit is fixed and through which the shaft projects, the battery compartment being angularly elongated and holding several such batteries.

5. The automatic lubricant dispenser defined in claim 4 wherein the circuit board is fixed to the insert above the motor unit, the upper housing part being formed with a pressure element engageable with the switch to actuate same.

6. The automatic lubricant dispenser defined in claim 5 wherein the pressure element is threaded into the upper housing part moves axially relative to the switch when turned.

7. The automatic lubricant dispenser defined in claim 1, further comprising
an elastomeric O-ring between the spindle and the collar.

8. The automatic lubricant dispenser defined in claim 1, further comprising
means including a seal engaged between the piston and the lower housing part for inhibiting rotation of the piston in the lower housing part about the axis.

9. The automatic lubricant dispenser defined in claim 1 wherein the circuit board includes circuit means for periodically energizing the motor and thereby advancing the piston and forcing the lubricant from the outlet.

10. The automatic lubricant dispenser defined in claim 9 wherein the circuit means includes means for cutting off the motor from the battery when the motor unit draws current exceeding a predetermined limit.

* * * * *